United States Patent Office 2,881,186
Patented Apr. 7, 1959

2,881,186
NEW DERIVATIVES OF 7-AMINOCOUMARIN

Heinrich Häusermann, Basel, Switzerland, assignor to J. R. Geigy A.-G., Basel, Switzerland, a Swiss firm No Drawing. Application October 31, 1955
Serial No. 544,045

Claims priority, application Switzerland November 12, 1954

11 Claims. (Cl. 260—343.2)

The present invention is concerned with new 3-substituted derivatives of 7-aminocoumarin which, because of their intensive blue to blue-green fluorscence, are suitable as optical brightening agents for more or less colourless organic material, in particular for organic textile fibres of the most varying origin as well as for polymeric synthetic materials. They are also suitable as intermediate products for the production of optical brightening agents. The invention also concerns processes for the production of the new 3-substituted derivatives of 7-aminocoumarin. It is further concerned with processes for the brightening of organic material with the new coumarin derivatives as well as, as industrial product, the material brightened with the aid of these compounds.

7-aminocoumarin compounds have already been suggested more than once as optical brightening agents for the most different types of substrata such as soap, cellulose fibres, wool, synthetic polypeptide fibres. However, 7-aminocoumarin compounds which are substituted in the 3-position of the coumarin ring by a phenyl radical, have not been known up to now. The present invention is concerned with the production of such new 3-substituted 7-aminocoumarin compounds and derivatives thereof.

It has been found that new valuable 3-substituted 7-aminocoumarins are obtained if a benzaldehyde which contains in the 2-position a hydroxyl group or a substituent which can be converted into a hydroxyl group and in the 4-position contains a substituted amino group or a substituent which can be converted into an amino group, is condensed by methods known per se with a derivative of acetic acid which contains a phenyl radical at the α-carbon atom, to form the corresponding β-phenylacrylic acid derivative. If desirable, then the group in the o-position to the acryl radical in the β-phenyl radical is liberated as a hydroxyl group and this, with the carboxyl function of the acrylic acid radical closes the coumarin ring. If necessary, possibly while sulphonating the reaction product, the substituent producing the amino group in the 7-position is modified to form this group at any stage desired during the reaction.

Benzaldehydes which can be used according to the invention are, for example, the known 2-hydroxy-4-nitrobenzaldehyde and the 2-hydroxy-4-acylaminobenzaldehydes obtainable therefrom by acylating reduction. Particularly favourable however, are the 2-alkoxybenzaldehydes which contain a nitro, or preferably an acylamino group in the 4-position which can be converted into the amino group. Because of disturbing side reactions, a primary amino group in the 4-position is to be avoided at all costs; but possibly tertiary amino groups such as the dimethyl or diethyl amino group for example can be in the 4-position.

Examples of acetic acid derivatives which can be condensed and which contain phenyl at the α-carbon atom are phenyl acetic acid or the esters thereof, in particular the alkyl ester, preferably however, the phenyl acetic acid nitriles (benzyl cyanides).

If desired, the aromatic rings in both starting materials can be further substituted, in particular by inert substituents according to the reaction conditions such as halogen, alkyl, nitro, acylamino groups, possibly also by alkoxy groups.

The condensation to form the β-phenylacrylic acid compound is performed by methods known per se, for example in alcohol in the presence of caustic alkalies, of alkali alcoholates or of piperidine. If o-alkoxy aldehydes are used for the condensation, then the liberation of the hydroxyl group follows; it is performed advantageously with anhydrous aluminium chloride in inert organic solvents such as benzene, chlorobenzene or nitrobenzene, possibly also in the aluminium chloride-sodium chloride melt, in the pyridine hydrochloride melt or also with a solution of hydrogen bromide in glacial acetic acid. Often the coumarin ring is closed at the same time. For this, it is not necessary that the carboxyl group of the acrylic acid radical should be in the free form; it can be in the modified form of the carboxylic acid ester, carboxylic acid amide and, preferably, of the nitrile group.

If the coumarin ring has not been closed on the dealkylation of the alkoxy group or if a β-(2-hydroxyphenyl)-acrylic acid derivative is obtained as reaction product in the first step, then it is advantageous to close the ring with a solution of hydrogen halide in a lower fatty acid. However, also other acid condensing agents can be used, for example zinc chloride or concentrated phosphoric acid.

If a 4-nitro-2-hydroxy- or -2-alkoxy-benzaldehyde is used as starting material, the nitro group is reduced to the amino group in some step of the reaction sketched above.

The 3-phenyl-7-acylaminocoumarins have proved to be particularly valuable optical brightening agents. The acyl radical in these compounds can be derived in particular, from carbamic acids which may possibly be organically substituted at the nitrogen atom. The acid radical can already be present in the starting material or it can be introduced into the 3-phenyl-7-aminocoumarin only in the last step of the reaction. In the latter case, a 3-phenyl-7-aminocoumarin is advantageously reacted in organic solution with an isocyanate. Particularly interesting optical brightening agents are obtained if radicals of carbamic acids are introduced to form 3-phenylcoumarin-7-ureido compounds.

An important modification of the process according to the present invention consists in converting the 3-phenyl-7-aminocoumarins by methods known per se with phosgene in inert organic solvents while warming, into the 3-phenylcoumarinyl-7-isocyanates and reacting these with ammonia or organic primary or secondary amines.

Thus, the new 3-substituted 7-aminocoumarin compounds correspond to the general Formula I

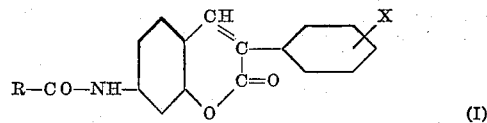

(I)

wherein X represents a member selected from the group consisting of H, Cl and CH₃, and R represents a member selected from the group consisting of amino and aminoalkyl radicals. Also the benzene ring of the coumarin structure can possibly be further substituted.

According to their composition, the new 3-substituted derivatives of 7-aminocoumarin have a more or less strong blue to blue-green fluorescence. In this connection, the new 3-phenyl compounds are particularly valuable. In contrast to the 7-aminocoumarins used up to now for optical brightening, the new 3-phenyl-7-aminocoumarins have a vivid blue fluorescence, also in the acylated condition. Thus, by variation of the acyl radical they can be modified in many ways to influence their affinity to organic substrata, in particular to different types of textile fibres. According to the composition, the 7-ureido-3-phenylcoumarins can be used for example for the optical brightening of wool, polyamide and polyurethane fibres, cellulose fibres, cellulose acetate, polyacrylonitrile fibres. They can also be incorporated in polymeric synthetic substances such as polyvinyl chloride, polystyrol or polyethylene and these polymers can be worked up to form fluorescent plastic foils.

In comparison with similar known compounds also the colour of the fluorescence light is shifted in an interesting manner in many cases. Thus the new 3-substituted 7-aminocoumarin compounds are a valuable addition to the group of fluorescent coumarin compounds.

The following examples illustrate the invention without limiting it in any way. Where not otherwise stated, parts are given as parts by weight and the temperatures are in degrees centigrade. The relationship of parts by weight to parts by volume is as that of kilogrammes to litres.

*Example 1*

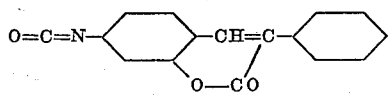

23.7 parts of 3-phenyl-7-aminocoumarin are dissolved in 1000 parts of abs. chlorobenzene at 110° and converted into the hydrochloride by the introduction of abs. hydrogen chloride. The almost colourless suspension of the base hydrochloride so obtained is then cooled to 50° and is reacted at a rising temperature while stirring with excess phosgene. As soon as the temperature has reached 100–110°, phosgene is still introduced until the HCl formation is complete. The temperature is then raised to 130°, upon which an almost complete solution is obtained. After hot filtration from the chlorobenzene solution, the resulting 3-phenylcoumarinyl-(7)-isocyanate crystallises out in colourless glittering little flakes. After cooling completely, the crystals are drawn off under suction, washed with some benzene and dried for a short time. The yield is 22–24 parts, i.e. 83–92% of the theoretical. The new isocyanate melts at 233° uncorrected and in inert organic solvents it has a fairly strong blue to violet fluorescence in daylight.

Because of its —N=C=O group which can be easily hydrolysed the isocyanate itself is not so suitable as a brightening agent but it is a very valuable intermediate product for the production of numerous ureas and urethanes which are suitable as brightening agents.

If in this example the 23.7 parts of 3-phenyl-7-aminocoumarin are replaced by 25.1 parts of 3-(p-methyl-phenyl)-7-aminocoumarin or by 27.15 parts of 3-(p-chlorophenyl)-7-aminocoumarin, then the 3-(p-methyl-phenyl)-coumarinyl-(7)-isocyanate (M.P. 214°) or the 3-(p - chlorophenyl) - coumarinyl - (7) - isocyanate (M.P. 225°) respectively are obtained. These isocyanates are also valuable intermediate products for the production of optical brightening agents.

*Example 2*

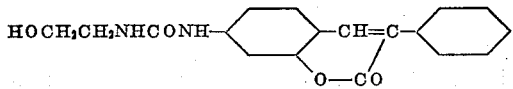

26.3 parts of the 3-phenyl coumarinyl-(7)-isocyanate obtained according to Example 1 are dissolved at 120–125° in 300 parts of nitrobenzene and 6.5 parts of monoethanolamine are added all at once. The temperature rises spontaneously to 132–136° and the solution still remains clear. It is allowed to cool. At even 125–130° the reaction product begins to precipitate in pale yellowish fine crystals and on cooling completely to 10–20° the reaction mixture consists of a thick crystal broth. After filtering under suction, the N-(β-hydroxyethyl)-N'-[3-phenyl coumarinyl-(7)]-urea is washed with some nitrobenzene and benzene and dried at 70–80° in the vacuum. The urea which is obtained as a pale yellowish powder in a yield of 29–31 parts (90–96% of the theoretical), melts on decomposition at 216–218°. In alcoholic solution it has a very vivid blue fluorescence in daylight. The product can be recrystallised from hot alcohol, upon which the melting point increases by 1–2°. Due to its strong fluorescence and its good drawing power on to various substrata, such as, e.g. wool, acetate silk and nylon, the new urea derivative can be used as an optical bleaching agent. Contrasted with the 7-alkyl aminocoumarins used in practice as brightening agents, this coumarin derivative has the advantage of a better fastness to light and a more blue white shading. If in this example the 26.3 parts of 3-phenyl-coumarinyl-(7)-isocyanate are replaced by 27.7 parts of 3-(p-methyl phenyl)-coumarinyl-(7)-isocyanate or by 29.8 parts of 3-(p-chlorophenyl)-coumarinyl-(7)-isocyanate, then the N-(β-hydroxyethyl)-N'-[3-(p-methyl phenyl)-coumarinyl-(7)]-urea (M.P. 255° on decomposition) or the N-(β-hydroxyethyl)-N'-[3-(p-chlorophenyl)-coumarinyl-(7)]-urea (M.P. 225° on decomposition) respectively are obtained. These two ureas have a somewhat more green fluorescence and can also be used as optical bleaching agents. Due to its good substantivity, also on cellulose fibres, N-(β-hydroxyethyl)-N'-[3-(p-methyl phenyl)-coumarinyl-(7)]-urea has a strong brightening effect.

*Example 3*

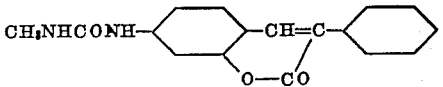

26.3 parts of 3-phenyl-coumarinyl-(7)-isocyanate obtained according to Example 1 are dissolved hot in 1000 parts of chlorobenzene and a solution of 3.1 parts of methylamine dissolved in chlorobenzene is added. The N - methyl - N' - [3 - phenyl - coumarinyl - (7)] - urea separates immediately as a yellowish crystalline precipitate. After cooling, the product is drawn off under suction, washed with a little chlorobenzene and dried. The yellowish crystals which are obtained in an almost quantitative yield, melt at 320° uncorrected and they dissolve in hot alcohol with a brilliant blue fluoroescence. This urea derivative is also a valuable brightening agent for diverse substrata.

If in this example the 3.1 parts of methylamine are replaced by 4.5 parts of ethylamine or 4.5 parts of dimethylamine or 5.9 parts of propylamine, then N-ethyl-N'-[3-phenyl-coumarinyl-(7)]-urea (M.P. 315°); N.N-dimethyl-N'-[3-phenyl-coumarinyl-(7)]-urea (M.P. 247°); N-propyl-N'[3-phenyl-coumarinyl-(7)]-urea (M.P. 233°) are obtained in an analogous manner.

Due to their strong fluorescence and good drawing power, all three products are suitable for the optical bleaching of various substrata.

*Example 4*

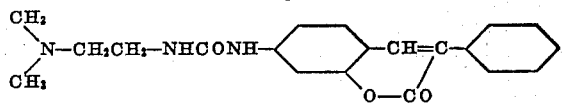

8.8 parts of N.N-dimethyl-ethylene diamine are reacted with 26.3 parts of 3-phenyl-coumarinyl-(7)-isocyanate dissolved in chlorobenzene. The N-(β-dimethylaminoethyl)-N'-[3-phenyl-coumarinyl-(7)]-urea obtained which melts at 206° dissolves in diluted acetic acid with a blue fluorescence and is suitable for the brightening of various substrata such as, e.g. nylon, Orlon, acetate silk and wool. If 10.2 parts of γ-dimethylamino-propylamine are used instead of the asymmetrical dimethylethylene diamine, then N - (γ - dimethylaminopropyl) - N' - [3 - phenyl-coumarinyl-(7)]-urea (M.P. 193°) is obtained which is somewhat less active as a brightening agent.

Example 5

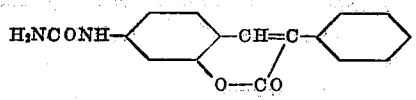

4.74 parts of 3-phenyl-7-aminocoumarin are dissolved at 60–70° in 150 parts of glacial acetic acid and a concentrated aqueous solution of 5 parts of potassium cyanate is added. On cooling, the 3-phenyl-coumarinyl-(7)-urea precipitates in pale yellowish fine crystals. The urea derivative melts on decomposition at 330° and, in methyl Cellosolve, it fluoresces a strong blue. This product also is excellently suitable for the optical bleaching of acetate silk and nylon. If the 4.74 parts of 3-phenyl-7-aminocoumarin are replaced by 5.02 parts of 3-(p-methyl phenyl)-7-aminocoumarin, then 3-(p-methyl phenyl)-coumarinyl-(7)-urea (M.P. 315° on decomposition) is obtained which has a somewhat more greenish fluorescence. This urea derivative can also be used for the brightening of substrata.

Example 6

25 parts of previously bleached wool fabric, e. g. wool flannel which has a slightly yellowish appearance, are treated in a dyebath (liquor ratio 1:30) which contains 0.05 part of the compound obtained according to Example 8 and 2.5 parts of Glauber's salt. The treatment is for 30 minutes at 50–60°. The goods are then rinsed and dried. The wool so treated has a higher white content than untreated wool.

A similar effect is obtained if the compound according to Example 4 is used instead of that according to Example 2.

Example 7

10 parts of slightly yelowish nylon material are dyed for 30 minutes at 60–70° in a dyebath (liquor ratio 1:40) which contains 0.005 part of the brightening agent obtained according to Example 2. The goods are rinsed with cold water and dried in the air. The material so treated has a much more white appearance than untreated material.

A very similar action is obtained if instead of the brightening agent according to Example 2, one according to Example 3 is used.

Example 8

100 parts of white woolen knitted goods are washed for 30 minutes at 40–50° in 1000 parts of a washing liquor which contains 2.5 parts of sodium salt of the acid dodecyl sulphate, 2.5 parts of Glauber's salt and 0.05 part of the brightening agent obtained according to Example 2. The goods are then rinsed and dried in the air. Woolen goods so washed have a considerably more white appearance than when washed without the addition of the brightening agent mentioned.

Example 9

10 parts of Orlon fabric which appears slightly yellowish are dyed for 30 minutes at 95–100° in a dyebath (liquor ratio 1:50) which contains 0.01 part of the brightening agent obtained according to Example 4 as well as 0.4 part of 80% acetic acid. After rinsing and drying, the Orlon material so treated has a considerably more white appearance than the untreated material.

The compounds listed in the following table are obtained by analogous processes. They are suitable for the optical brightening of the substrata indicated.

| No. | Compound | Produced according to example or by | suitable for the brightening of |
|---|---|---|---|
| 1 | N-γ-methoxypropyl-N'-3-phenyl-coumarinyl-(7)-urea (M.P. 205°). | Ex. 2 + γ-methoxypropylamine. | polyamide fibres, cellulose acetate fibres. |
| 2 | N-α-methyl-β-hydroxyethyl-N'-3-phenylcoumarinyl-(7)-urea (M.P. 193°). | Ex. 2 + α-methyl-β-hydroxyethylamine. | polyamide fibres, cellulose acetate fibres, wool. |
| 3 | N-hydroxyethyl-N-methyl-N'-3-phenylcoumarinyl-(7)-urea (M.P. 198°). | Ex. 2 + hydroxyethyl-methylamine. | polyamide fibres, cellulose acetate fibres. |
| 4 | N-carboxymethyl-N'-3-phenylcoumarinyl-(7)-urea (M.P. 240° on decomposition). | Ex. 2 + aminoacetic acid. | wool, polyamide fibres. |
| 5 | N-β-sulphoethyl-N'-3-phenylcoumarinyl-(7)-urea. | Ex. 2 + Taurine. | Do. |
| 6 | N-3-sulphophenyl-N'-3-phenylcoumarinyl-(7)-urea. | Ex. 2 + 3-aminobenzene sulphonic acid. | cotton, viscose, paper. |
| 7 | N-4-methyl-3-sulphophenyl-N'-3-phenylcoumarinyl-(7)-urea. | Ex. 2 + 2-methyl-5-aminobenzene-1-sulphonic acid. | Do. |

What I claim is:
1. The 7-aminocoumarin derivative having the general formula:

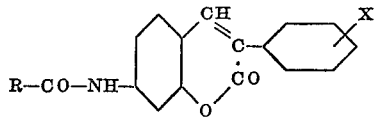

wherein X represents a member selected from the group consisting of H, Cl and CH₃, and R represents a member selected from the group consisting of amino and alkylamino radicals.

2. The 7-aminocoumarin derivative having the formula:

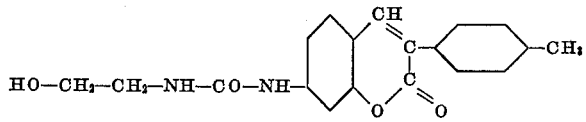

3. The 7-aminocoumarin derivative having the formula:

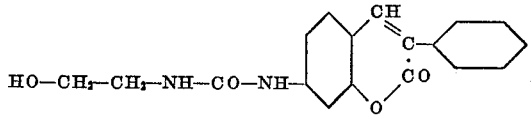

4. The 7-aminocoumarin derivative having the formula:

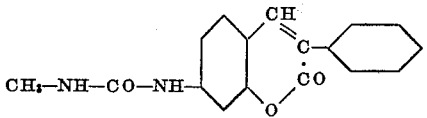

5. The 7-aminocoumarin derivative having the formula:

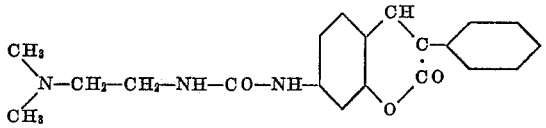

6. The 7-aminocoumarin derivative having the formula:

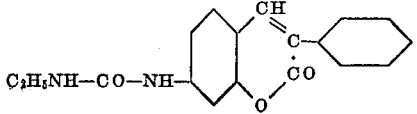

7. N-propyl-N'-[3-phenyl-coumarinyl-(7)]-urea.
8. N - (γ - dimethylaminopropyl) - N' - [3 - phenyl - coumarinyl-(7)]-urea.
9. N - (γ - methoxypropyl) - N' - [3 - phenyl - coumarinyl-(7)]-urea.
10. N - (α - methyl - β - hydroxyethyl) - N' - [3 - phenyl-coumarinyl-(7)]-urea.
11. N - hydroxyethyl - N - methyl - N' - [3 - phenyl - coumarinyl-(7-]-urea.

References Cited in the file of this patent

UNITED STATES PATENTS

| | | |
|---|---|---|
| 2,600,375 | Ackermann | June 17, 1952 |
| 2,610,152 | Ackermann | Sept. 9, 1952 |
| 2,646,355 | Zweifel et al. | July 21, 1953 |

OTHER REFERENCES

Fujikawa et al.: Chem. Abst., vol. 47, page 6494 (1953).